United States Patent
Prasad

(10) Patent No.: US 9,823,486 B2
(45) Date of Patent: *Nov. 21, 2017

(54) ROTATING POINT-SPREAD FUNCTION (PSF) DESIGN FOR THREE-DIMENSIONAL IMAGING

(71) Applicant: STC. UNM, Albuquerque, NM (US)

(72) Inventor: Sudhakar Prasad, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/133,054

(22) Filed: Apr. 19, 2016

(65) Prior Publication Data

US 2016/0291343 A1    Oct. 6, 2016

Related U.S. Application Data

(63) Continuation-in-part of application No. 14/202,915, filed on Mar. 10, 2014, now Pat. No. 9,350,977.

(60) Provisional application No. 61/776,181, filed on Mar. 11, 2013.

(51) Int. Cl.
| | |
|---|---|
| *G02B 27/58* | (2006.01) |
| *G01C 11/02* | (2006.01) |
| *G02B 5/30* | (2006.01) |
| *G02B 5/18* | (2006.01) |
| *G02B 21/36* | (2006.01) |
| *G02B 27/26* | (2006.01) |
| *G02B 27/00* | (2006.01) |

(52) U.S. Cl.
CPC ............. *G02B 27/58* (2013.01); *G01C 11/02* (2013.01); *G02B 5/189* (2013.01); *G02B 5/3083* (2013.01); *G02B 21/36* (2013.01); *G02B 21/361* (2013.01); *G02B 27/0075* (2013.01); *G02B 27/26* (2013.01)

(58) Field of Classification Search
CPC .... G02B 27/58; G02B 21/36; G02B 27/0075; G02B 21/361; G02B 5/189; G02B 5/3083; G02B 27/26; G01C 11/02
See application file for complete search history.

(56) References Cited

U.S. PATENT DOCUMENTS

| 5,642,456 A * | 6/1997 | Baker .................... G02B 6/266 359/230 |
| 7,705,970 B2 * | 4/2010 | Piestun .................... G01C 3/08 356/4.01 |
| 8,620,065 B2 | 12/2013 | Piestun et al. |
| (Continued) | | |

OTHER PUBLICATIONS

Prasad, Sudhakar; Rotating Point Spread Function via Pupil-Phase engineering; Optic Letters, vol. 38, No. 4; Feb. 15, 2013;; pp. 585-587; Optical Society of America; US.

*Primary Examiner* — Sath V Perungavoor
*Assistant Examiner* — Howard D Brown, Jr.
(74) *Attorney, Agent, or Firm* — Keith A. Vogt; Vogt IP

(57) ABSTRACT

An optical imaging system having an aperture comprised of a plurality of concentric annuli. The outer radius of each annulus is proportional to the square root of the number of annuli. Each annulus also having an azimuthally linearly increasing phase profile comprising for a given light wavelength. The system also includes a birefringent plate and the aperture and birefringent plate are adapted to jointly encode the full spatial and polarimetric degrees of freedom of a point source.

20 Claims, 11 Drawing Sheets

(56) References Cited

U.S. PATENT DOCUMENTS

| | | | |
|---|---|---|---|
| 2006/0152687 A1* | 7/2006 | Robinson | G02B 27/281 353/97 |
| 2009/0276188 A1 | 11/2009 | Cui et al. | |
| 2010/0015935 A1* | 1/2010 | Zeng | H04B 17/345 455/206 |
| 2010/0195873 A1* | 8/2010 | Cui | G01B 11/2441 382/106 |
| 2011/0249866 A1* | 10/2011 | Piestun | G06T 7/77 382/103 |
| 2012/0069320 A1* | 3/2012 | Slmonov | G01C 3/32 356/4.04 |

* cited by examiner $\alpha = \lambda/(r-1)$
$\lambda$: wavelength
r: index of refraction
l = 1,2,..,L: zone index
Schematic of a 5-zone element (L=5)
(Color-coded for ease of visualization)

100 Top View

R: radius of the element l-turn spiral phase in the lth zone

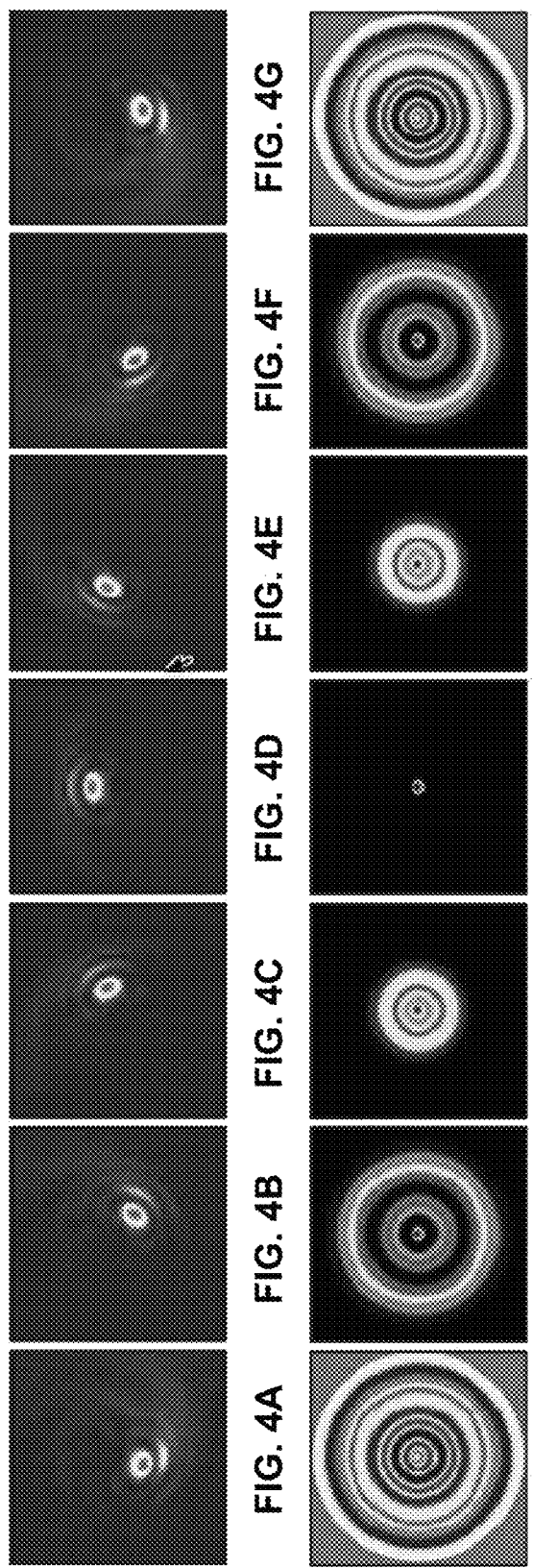

SA=0

SA=8 units

SA=16 units

ROTATING POINT-SPREAD FUNCTION (PSF) DESIGN FOR THREE-DIMENSIONAL IMAGING

CROSS-REFERENCE TO RELATED APPLICATIONS

This application is a continuation in part of U.S. application Ser. No. 14/202,915, filed Mar. 10, 2014 and herein incorporated by reference, which claims the benefit of U.S. Provisional Application No. 61/776,181, filed Mar. 11, 2013 and herein incorporated by reference.

STATEMENT REGARDING FEDERALLY SPONSORED RESEARCH OR DEVELOPMENT

This invention was made with government support under ASOFR Grant Nos. F9550-09-1-0495 and F9550-11-1-0194 as well as DARPA Contract No. W15P7T-11-C-A901. The Government may have certain rights in the invention.

INCORPORATION-BY-REFERENCE OF MATERIAL SUBMITTED ON A COMPACT DISC

Not Applicable.

BACKGROUND OF THE INVENTION

The discovery of orbital-angular-momentum (OAM) states-of-light beams has resulted in a number of important applications, including microparticle rotation, high-information-density free-space communication protocols, quantum cryptography, and quantum superdense coding. By linearly superposing light states with different OAM quantum numbers possessed by different Gauss-Laguerre (GL) modes under free-space propagation, beams with amplitude, phase, and intensity patterns that merely rotate with propagation while maintaining their transverse shape may be realized.

Imaging systems using an incoherent point-spread function (PSF) that rotates at a uniform rate with changing defocus while maintaining its shape and form approximately have been used to encode the axial coordinate of a point source in a 3D scene with a sensitivity that is nearly uniform over the entire scene. The demonstration of a rotating double-helix PSF by superposing suitably chosen GL modes and its further improvement in light efficiency by pupil-phase optimization have led to methods for generating high-throughput rotating PSFs.

By contrast, for a clear, well corrected imaging aperture in space, the point-spread function (PSF) in its Gaussian image plane has the conventional, diffraction-limited, tightly focused Airy form. Away from that plane, the PSF broadens rapidly, however, resulting in a loss of sensitivity and transverse resolution that makes such a traditional approach untenable for rapid 3D image acquisition. Thus, a major drawback is that the scanning must be done in focus to maintain high sensitivity and resolution as image data is acquired, slice by slice, from a 3D volume with reduced efficiency.

BRIEF SUMMARY OF THE INVENTION

The present invention solves the above noted drawbacks by generating a rotating PSF that uses Fresnel zones in the entrance pupil of the imager, with successive zones carrying spiral phase profiles of regularly spaced topological quantum number. The present is superior to the GL-mode-based approach in the sense that it can generate a more compact single-lobe PSF with greater focal range independent of its shape. It also permits a ready generalization to non-quadratic but azimuthally symmetric phase aberrations of the imager, and thus furnishes a method for encoding information about any spherical aberrations (SAs) of the imaging optics as well.

In addition, an alternate embodiment of the present invention uses a phase-only mask, which may have a 100% transmission efficiency that is superior to the pure GL modal approach in which the pupil function must be modified both in its amplitude and phase. The present invention has an improved sensitivity for the recovery of depth information even under low-light levels. Moreover, because of the single-lobe character of the PSF, the extraction of defocus variation across a densely populated 3D field of point sources is potentially less challenging than with the double-helix PSF with two nearly equally bright but well-separated lobes.

In another embodiment, the present invention provides a computational-imaging approach that also overcomes many of the limitations found in prior approaches. Pupil-phase engineering is used to fashion a PSF that maintains its shape and size while rotating uniformly with changing defocus over many waves of defocus phase at the pupil edge. Dividing a circular pupil aperture into L Fresnel zones, with the lth zone having an outer radius proportional to $\sqrt{l}$, and impressing a spiral phase retardation of form $l\phi$ on the light wave, where $\phi$ is the azimuthal angle coordinate measured from a fixed x axis (the "dislocation" line) in the pupil plane, yields a PSF consisting of approximately non-diffracting Bessel modes that rotates with defocus while keeping its shape and size over much larger axial depths.

A photon carries both spin angular momentum (SAM) and orbital angular momentum (OAM). They have both been exploited abundantly in a variety of applications ranging from microparticle rotation, high-bit-rate free space communication, quantum cryptography, and quantum superdense coding. The photon SAM is related to the polarization properties of an optical beam, which fundamentally is comprised of photons, while its OAM controls its spatial rotation about a center and thus the full three dimensional (3D) position coordinates of the location of the light source emitting the beam.

Accordingly, in one embodiment, the present invention concerns the conversion of SAM into OAM to provide an approach for encoding the polarimetric degrees of freedom (DOF) of the imaging light into its OAM DOF which, in turn, can result in a rotating point-spread function (PSF). The angle and center of rotation and the detailed spatial form of the PSF corresponding to the image of a point source contain detailed joint information about the polarimetric properties and the 3D location of the source.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 4A, 4B, 4C, 4D, 4E, 4F, 4G, 4H, 4I, 4J, 4K, 4L, 4M and 4N is a series of surface plots of an incoherent rotating PSF, with L=7 zones as shown in the top row, with the IDL-PSF is shown in the bottom row of plots, the plots from left to right are for increasing values of defocus, namely −24, −16, −8, 0, 8, 16, and 24 radians at the pupil edge.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
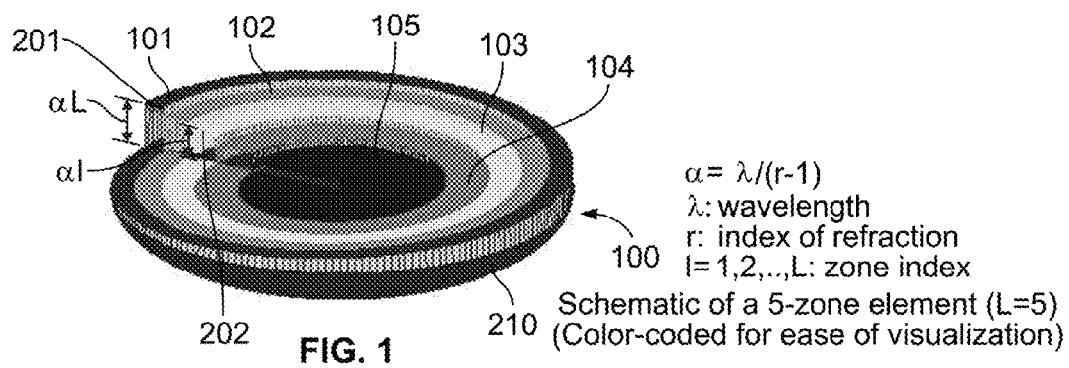
FIG. 1 is a schematic of one embodiment of the present invention.
Figure 2:
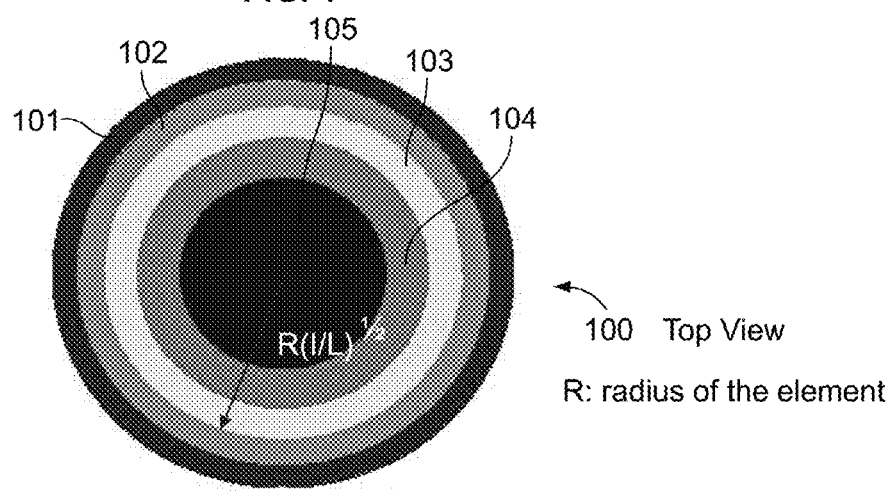
FIG. 2 is a top schematic view of the embodiment shown in FIG. 1.
Figure 3:
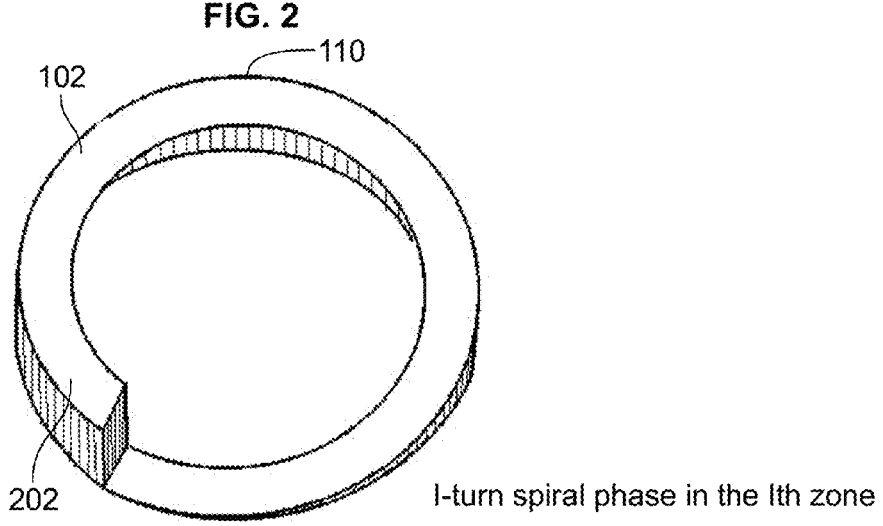
FIG. 3 is schematic diagram of a specific Fresnel zone with its spiral phase.

The following description of the preferred embodiments describes a pupil and rotating PSF. This description is not to be taken in a limiting sense, but is made merely for the purpose of illustrating the general principles of the invention. The scope of the invention is defined by the appended claims. In a preferred embodiment, the present invention provides, as shown in FIGS. 1 and 2, a segmented pupil or lens 100 made of a plurality of zone elements 101-105. FIG. 3 shows an example of an individual zone 110, which may be a Fresnel zone.

In a preferred embodiment, pupil 100 has a radius R that has been segmented into L different contiguous annular Fresnel zones, with the lth zone having an outer radius equal to $R\sqrt{l/L}$. The lth zone is endowed with a spiral phase profile of form $l\phi$ that completes l complete phase cycles as the azimuthal angle $\phi$ completes a single rotation about the optical axis. The phase dislocation lines for all the zones are taken to be a single fixed radial line, which may be along the x-axis in the pupil plane.

For such a phase encoded pupil, as a function of image-plane radial distance and azimuthal angle coordinates, s and $\phi$, the amplitude PSF K is given by the pupil integral of Equation (1):

$$K(s, \phi; \zeta) = \frac{1}{\sqrt{\pi}} \int_{u \leq 1} d^2u \exp[i2\pi\vec{u}\cdot\vec{s} - i\zeta u^2 - i\psi(\vec{u})], \qquad (1)$$

where $\vec{s}$ is the image-plane position vector $\vec{r}$ normalized by the in-focus diffraction spot-radius parameter at the imaging wavelength $\lambda$ for the in-focus object plane a distance $l_0$ from the pupil, $$\vec{s} = \frac{\vec{r}}{r_0}, r_0 \stackrel{def}{=} \frac{\lambda l_0}{R}, \qquad (2)$$

and $\vec{u}$ is the pupil-plane position vector $\vec{p}$ normalized by the pupil radius, $\vec{u}=\vec{p}/R$. The defocus parameter $\zeta$ is related to the object-plane distance $\delta z$ from the in-focus object plane as $$\zeta = \frac{\pi \delta z R^2}{\lambda l_0 (l_0 + \delta z)}. \qquad (3)$$

In this scaled form, it is precisely equal to the phase at the edge of the pupil that results from the actual spatial defocus. The incoherent PSF, $h(s, \phi; \zeta)=/K(s, \phi; \zeta)/^2$, is normalized to have area 1, corresponding to a clear aperture that transmits all the light falling on it.

For the Fresnel-zone spiral phase function $\psi(\mu, \phi_\mu)$ discussed above, the integral (1) may be evaluated as $$K(s, \phi; \zeta) = \frac{2\pi}{\sqrt{\pi}} \sum_{l=1}^{L} i^l \exp(il\phi) \times \int_{\sqrt{(l-1)/L}}^{\sqrt{l/L}} du\, u J_l(2\pi us) \exp(-i\zeta u^2), \quad (4)$$

using the identity $$\oint d\phi_\mu \exp[ix \cos(\phi_\mu - \phi) + il(\phi_\mu - \phi)] = 2\pi i^l J_l(x) \quad (5)$$

in which integration is performed over a fundamental period of the azimuthal angle $\phi_\mu$. For sufficiently small s the integration over $\mu$ may be performed approximately by treating the Bessel function $J_l$ as a constant over the lth zone. Such an evaluation reveals the approximate rotational character of the PSF with changing defocus, $$K(s, \phi; \zeta) \approx \qquad (6)$$

$$2\sqrt{\pi} \exp[i\zeta/(2L)] \frac{\sin[\zeta/(2L)]}{\zeta} \times \sum_{l=1}^{L} i^l \exp(il(\phi - \zeta)) J_l(2\pi\sqrt{l/L}\,s).$$

The prefactor in this expression also indicates that the PSF must break apart for values of $\zeta$ outside the range ($-L\pi$, $L\pi$) over which the PSF performs one complete rotation. These properties of the PSF are easily verified by means of the numerically evaluated exact expression.

Allowing the PSF to rotate with defocus stabilizes its shape governing the PSF behavior in the face of a changing defocus. A useful equation is that the amplitude PSF K is:

$$i\frac{\partial K}{\partial \zeta} = -\frac{1}{4\pi^2} \vec{\nabla}^2 K, \quad (7)$$

which is easily verified from the integral expression (1) for K. Here $\vec{\nabla}$ denotes the two-dimensional gradient operator in the image plane. Equation (7) is formally identical to the Schrödinger equation of motion for the wavefunction of a free particle in quantum mechanics (QM). It therefore admits a simple conservation law for the intensity PSF, $h = |K|^2$, rather analogous to the probability flux conservation law in QM, $$\frac{\partial h}{\partial \zeta} = -\frac{1}{4\pi^2 i} \vec{\nabla} \cdot (K^* \vec{\nabla} K - K \vec{\nabla} K^*), \quad (8)$$

which may be expressed more simply in terms of h and the phase of K, namely $\psi_K$, by substituting $K = \sqrt{h} \exp(i\psi_K)$, $$\frac{\partial h}{\partial \zeta} = -\frac{1}{2\pi^2} [\vec{\nabla} h \cdot \vec{\nabla} \psi_K + h \vec{\nabla}^2 \psi_K] \quad (9)$$

$$= -\frac{1}{2\pi^2} \vec{\nabla} \cdot (h \vec{\nabla} \psi_K).$$

Expression (9) may be transformed, via the divergence theorem, into an integral form over any domain D bounded by the closed curve C in the image plane $$\frac{d}{d\zeta} \iint_D h\, d^2 r = -\frac{1}{2\pi^2} \oint_C h \frac{\partial \psi_K}{\partial n} dl, \quad (10)$$

in which the vector field $h\vec{\nabla} \psi_K$ represents an approximate boundary probability-flux density per unit cross-length that determines what fraction of the PSF that may be lost from D through C.

The conservation law (Equation 10) shows why adding rotation stabilizes the PSF against spreading. For the PSF (Equation 6), the flux density vector $h\vec{\nabla} \psi_K$ is dominated by its azimuthal component, proportional to $\partial \psi_K / \partial \phi$, for which the PSF merely circulates without spreading as the defocus $\zeta$ is varied. The evolution of the PSF area contained in such a rotating domain is sensitive to only differential rotations between different parts of the PSF and to any residual, diffusive radial spreading, as described by Equation (9).

FIG. 4 show the PSF rotation with defocus for 7 Fresnel zones, L=7. The surface plot of $|K|^2$, with K given by expression (4), is made at a succession of increasing values of the defocus parameter $\zeta$. While the PSF remains nearly shape and size invariant as it rotates at the rate of 1/L radians per unit defocus phase completing a full rotation for a defocus change of about $2\pi L$ radians, in consistency with the approximate result (6), there is clear evidence of differential rotation and slow spreading. The secondary lobe of the PSF clearly lags the main lobe even as the latter shears under differential rotation. After a complete rotation the PSF begins to show rapid break-up and spreading, presaged by the $\zeta$-dependent sine prefactor in the approximate expression (6). But over the same range of defocus values from -24 rad to 24 rad, the ideal diffraction-limited (IDL) PSF exhibits no rotation but a rapid spreading away from zero defocus, as is well known, and shown in the bottom panel of plots.

A nonzero defocus of a point source means a quadratic optical phase in the pupil that, because of the square-root dependence of the zone radius on the zone number, increases on average by the same amount from one zone to the next. This uniformly incrementing phase yields, in effect, a rotation of the phase dislocation line, and thus a rotated PSF. Since the zone-to-zone phase increment depends linearly on defocus to first order, the PSF rotates uniformly with changing defocus to that order. The breakdown of this first-order approximation occurs slowly over a complete rotation of the PSF, corresponding to a change of about $2\pi L$ radians of defocus phase at the pupil edge.

The shape and size invariance of the rotating PSF allows for rapid acquisition of a full three-dimensional (3D) image scene of point sources with high sensitivity. It also permits an efficient recovery of their full three-dimensional coordinates.

Simulation-based tests for the extraction of source parameters from a 3D scene known to consist of point sources alone were run. An inverse problem that may be set up to extract the number of point sources and their spatial coordinates and flux is that of minimizing the following unregularized cost function:

$$C(\{r_1, \ldots, r_P; z_1, \ldots, z_P; F_1, \ldots, F_P\}) = \qquad (11)$$

$$\frac{1}{2\sigma^2} \left\| G - \sum_{i=1}^{P} F_i H(r_i; z_i) \right\|_2^2,$$

where G denotes the two-dimensional noisy image data matrix, $H(r_i; z_i)$ the rotating PSF (blur) matrix for the ith point source of flux $F_i$, transverse location $r_i$, and depth $z_i$. The number of sources, P, is not known a priori but is to be estimated from the data. The minimization of (11) is performed iteratively until agreement with noise is attained, roughly when the average chi-squared-value equal to the number of image-plane pixels is reached. The procedure is repeated for different values of P starting from 1 until the minimum value of the cost function is consistent with the mean chi-squared value.

The starting point-source locations, particularly in the transverse image plane, are dictated by the spatial distribution of the image data and are chosen to allow for spatial overlap between the estimate computed from the forward model based on these locations and the image data to induce the optimization algorithm to move the estimate down the cost-function landscape in the space of the parameters being estimated. All the source fluxes were started at zero value as were all the depth coordinates.

The Matlab based minimization code, fminunc, was able to drive down the cost function C toward the mean chi-squared-value, or "perfect" fit, which is $N_p^2/2$ for an $N_p \times N_p$ image. Since in the presence of noise, the cost function can fluctuate around its mean value by amount of order $\sigma_x = N_p \sqrt{2}$, of order 90 for $N_p=128$ used in a simulations, the expect agreement for a "perfect" fit between the actual data and the forward-model-based data was estimated to be within 1-2 times $\sigma_x$.

Figure 5B:
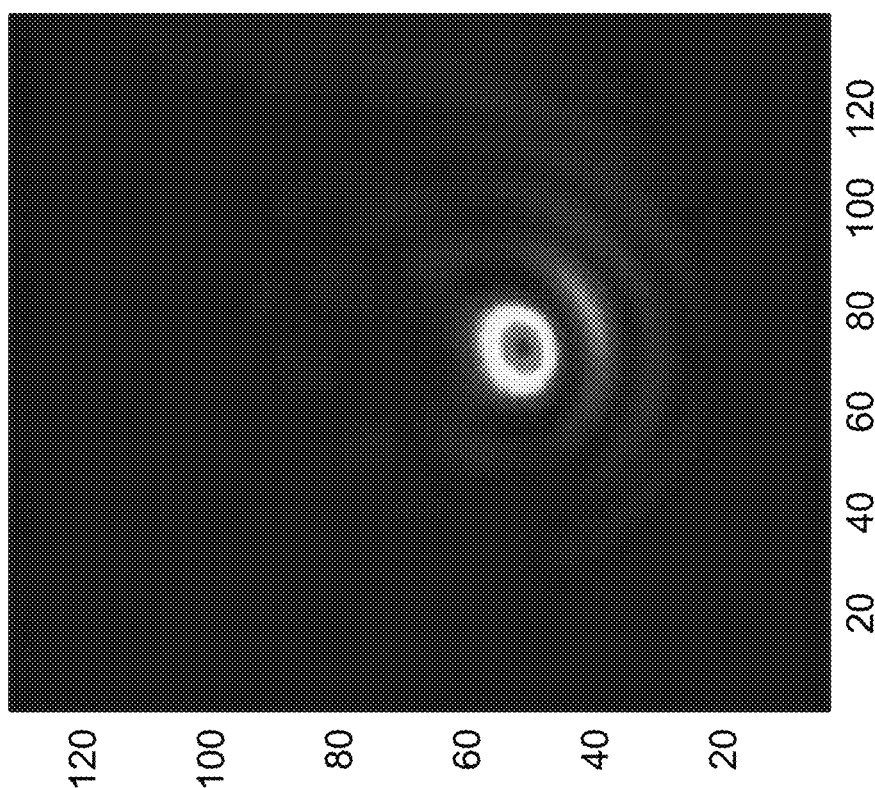
FIG. 5A and FIG. 5B are images of a point-source pair for two different source separations of 10 and 2 pixel units in the same transverse plane.
Figure 5A:
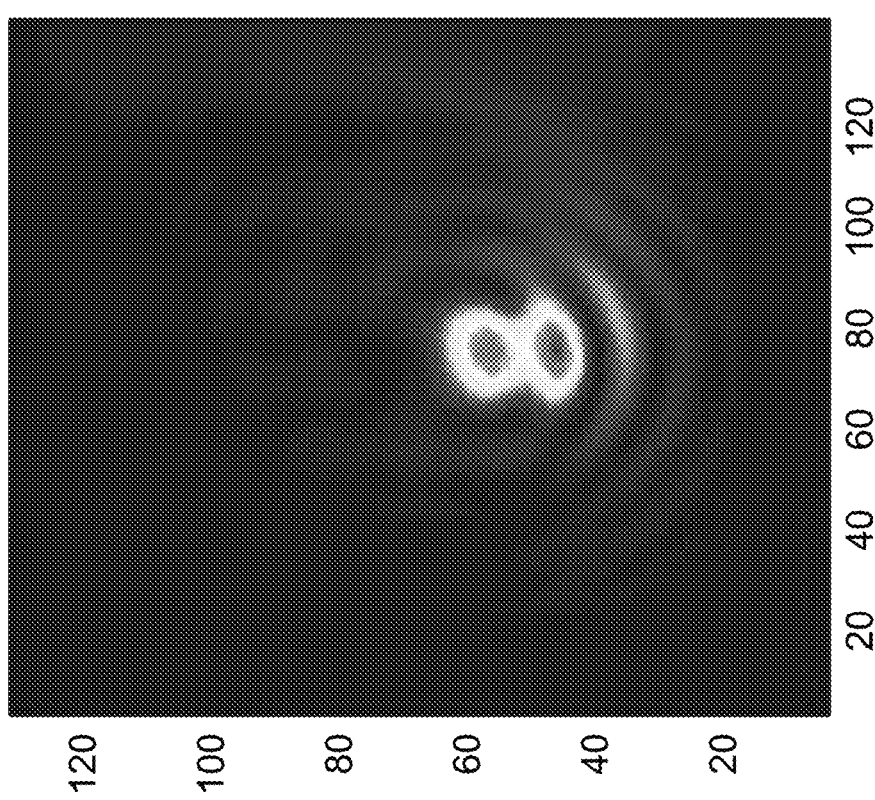

FIG. 5A shows the images of two point sources that are 10 pixels apart, but when they are brought closer together, placing them only 2 units apart along the short dimension of the PSF, their noise-free images overlap considerably, as shown in FIG. 5B, and the sources may be regarded as being barely, if at all, resolvable. In this case both the one-source and two-source starting assumptions produce comparable cost-function minima, as in FIG. 5B. The ability to achieve arbitrary amounts of spatial resolution depends on the SNR. The number of iterations to achieve the minimum value of the cost function is about 50.

Figures 6A, 6B:
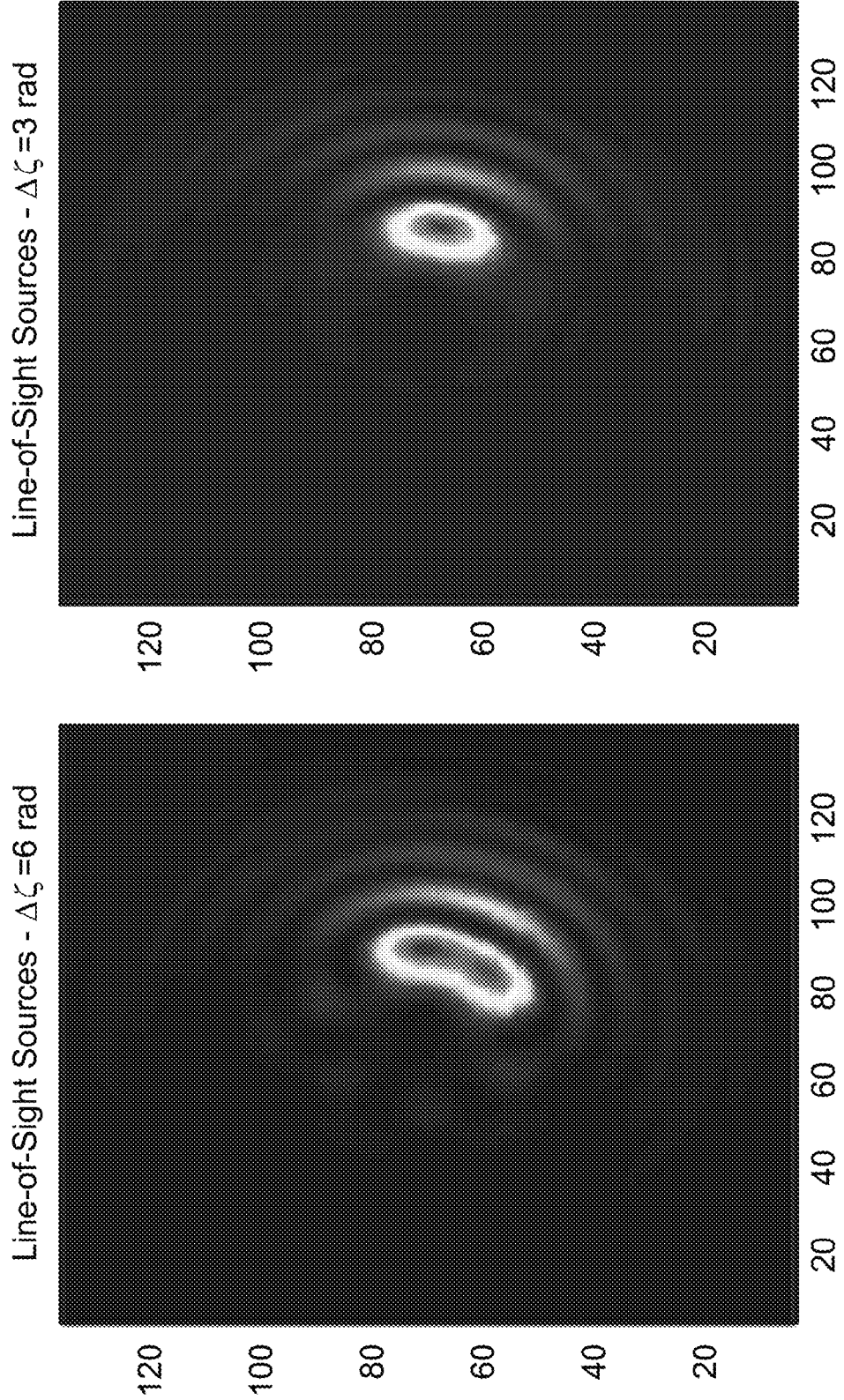
FIG. 6A and FIG. 6B are images of a point-source pair in the line of sight at the center of the field but at two different depths, corresponding to (a) 0 and 6 radians and (b) 0 and 3 radians of defocus phase at the pupil edge.
Figure 9:
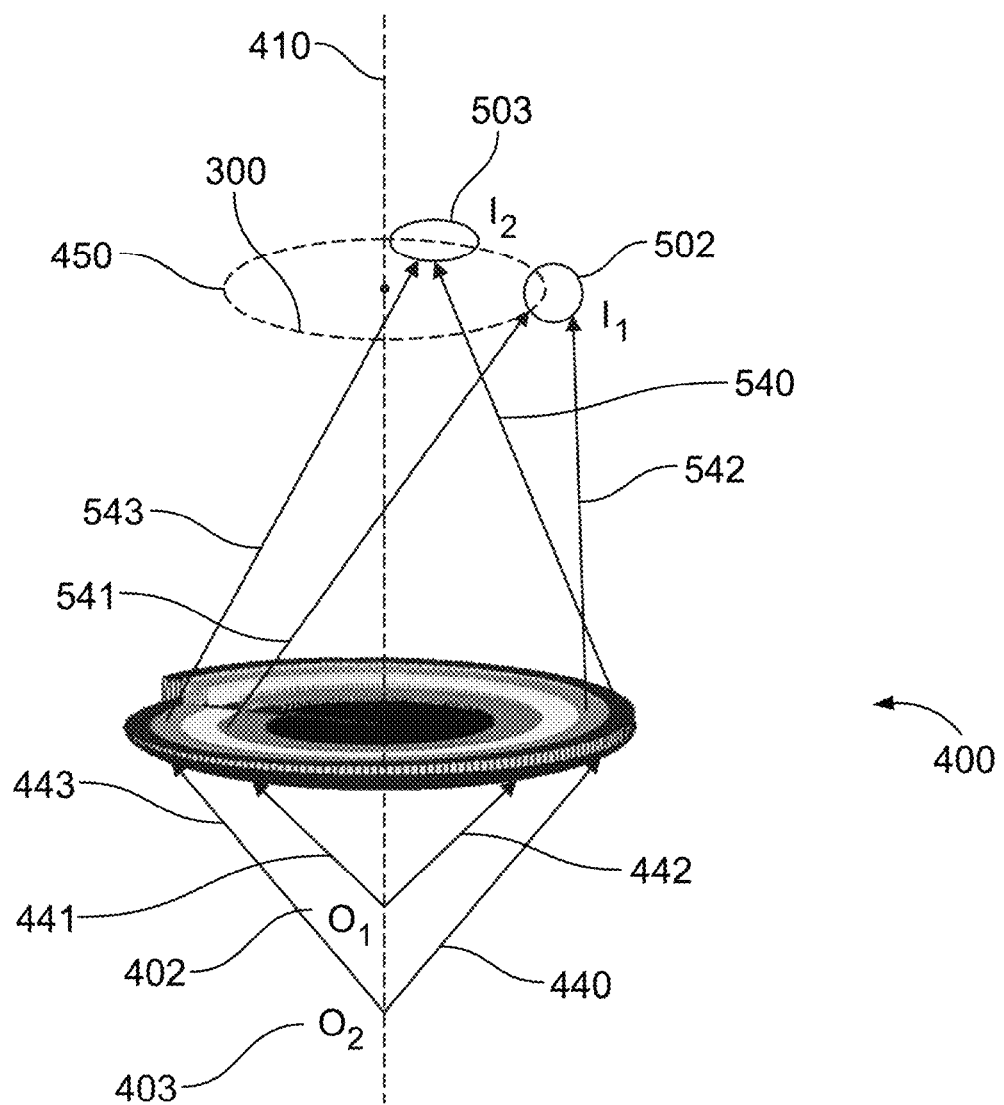
FIG. 9 is a schematic of another embodiment of the present invention.

The longitudinal, or depth (z), resolution for two point sources that are along the same line of sight but at slightly different depths, as measured by the defocus phase at the pupil edge of value 6 radians and 3 radians, for the two images shown in FIGS. 6A and 6B. The first case corresponds to z-resolvable sources, while in the latter case the sources seem visually irresolvable. Yet, an analysis of depth estimates shows that in both cases the depth estimates are quite accurate. This is supported by the observation that the minimum value of the cost function is well within $\pm 2\sigma$ of the mean chi-squared value of $N_p^2/2$ for both cases when the correct two-source assumption is made in the reconstruction. For the incorrect one-source assumption, the minimum value of the cost function in both cases is well outside this range of "fit" to data within the noise. FIG. 9 shows the minimum cost function for the same ten PSNR values discussed earlier for the correct two-source assumption and the incorrect one-source assumption in the two cases.

The problem of recovering the location and flux parameters of a 3D scene consisting of P point sources alone requires optimization in a low-dimensional parametric space of dimensionality 4P. This is a relatively simple problem with high sparsity, a fact that is responsible for a highly robust reconstruction protocol that can yield some super resolution, as we have seen above.

Figure 7:
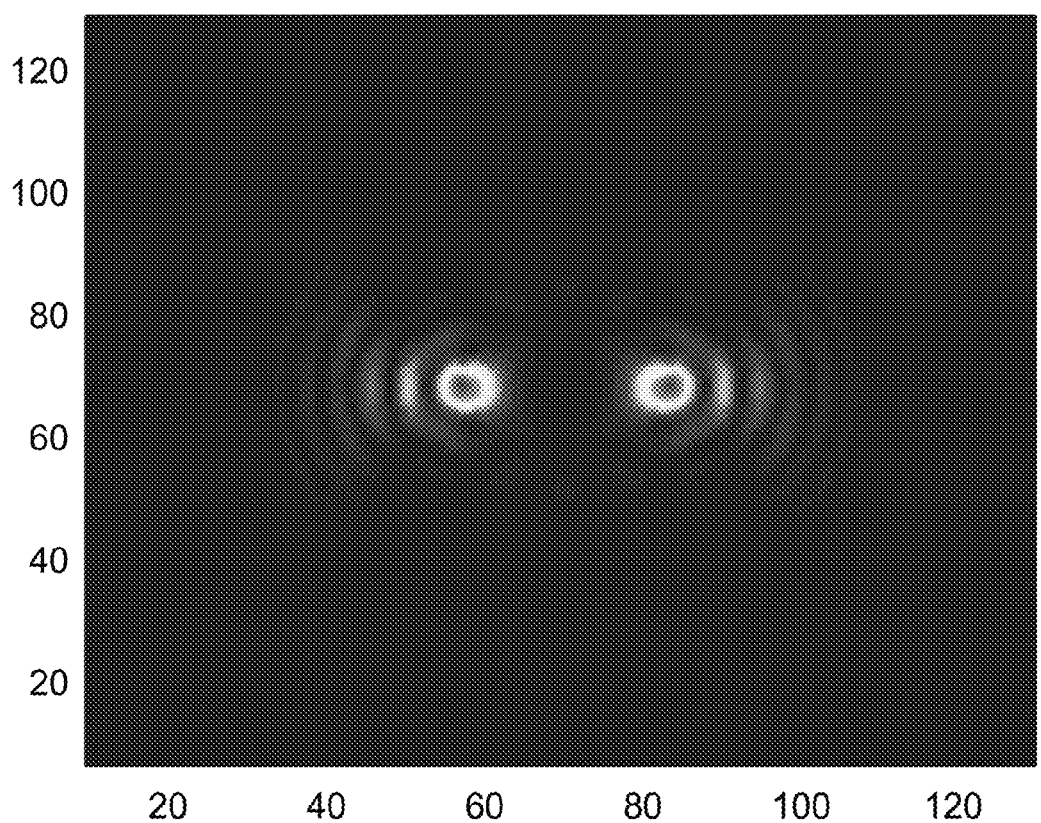
FIG. 7 is an image of the inversion-symmetric double-lobed structure of the PSF at wavelength $\lambda_2$.

For an extended 3D object, the full description, even for a single pose of the object, requires the specification of both the brightness and depth, namely $l_{ij}$, $z_{ij}$, as a function of the pixel index ij over an $N_p \times N_p$ pixel array, for a total of $2N_p^2$ unknown parameters. Computer simulations of 3D scenes with a variety of spatial depth and intensity profiles with image data were acquired with the rotating-PSF at two different wavelengths. For the sake of simplicity and to develop a deeper conceptual understanding of the highly complex problem of reconstruction of 3D images from 2D rotating-PSF image data, two wavelengths $\lambda_1$ and $\lambda_2$ were selected to be such that the ratio $(r_1-1)/\lambda_1:(r_2-1)/\lambda_2$ is 1:2, where $r_1$ and $r_2$ are the indices of refraction of the spiral glass structure at the two wavelengths. The ratio of the rates of PSF rotation at the two different $\lambda$'s can be easily shown to be $(r_1-1)/(r_2-1)$. Also, even if the PSF at $\lambda_1$ is not invariant under coordinate inversion, it will be invariant under such inversion at $\lambda_2$ because the analog of the sum (4) representing the PSF at this wavelength has only even-l terms. This property is seen in the double-lobed structure of the PSF displayed in FIG. 7.

While both PSFs rotate and keep their shape invariant with changing defocus, their shapes are quite different, and they thus provide the needed PSF diversity for the acquisition of two different image frames. Alternatively, a spatial-light modulator, such as a liquid-crystal array, located either in the aperture plane or a conjugate plane thereof, can create, on demand, by means of a voltage modulation, a spiral phase structure of the requisite winding number from zone to zone. This has the advantage of not relying on any extraneous assumptions that may not be justified.

The recovery of the transverse and longitudinal location parameters of closely-spaced point sources along with the increased depth of field afforded by the rotating-PSF imager has many applications. For example, an application of one embodiment of the present invention, is for use with a 3D imager. The imager may be used as a target or object acquisition unit and system that is capable of monitoring moving objects, such as space debris, of all different sizes and origins for their field locations as well as their ranges. Typically, the smaller the debris the more numerous they are, with sizes of order 1 mm or smaller being about $10^4$ times more likely than those of order 1 cm or larger. The rotating-PSF concept presents a technique for rapid snapshot imaging of a large 3D field of debris and other objects.

The maximum depth resolution at sufficiently high values of PSNR corresponds to about 1 radian of defocus phase at the pupil edge, $\Delta\zeta=1$. In view of the definition (3) of $\zeta$, this corresponds to a minimum resolvable depth $\delta z_{min}$ of order $$\delta z_{min} = \frac{\lambda}{\pi}\left(\frac{l_0}{R}\right)^2, \quad (12)$$

as long as $\delta z_{min} \ll l_0$. The $\delta z_{min}$ scales quadratically with range $l_0$, but as $l_0$ becomes so large that $\delta z_{min}$ becomes comparable to or larger than $l_0$ then, as the definition (3) suggests, $\zeta$ becomes independent of $\delta z$, and the imager can no longer resolve such large depths.

In another embodiment, for a telescope diameter of 2R=20 cms and illuminating wavelength of $\lambda=1$ μm, the minimum resolvable depth at $l_0=1$ km is about 30 m and at $l_0=100$ m about 30 cm, while the operational depth ranges $\Delta z$ over which the imager produces robust images corresponding to $\zeta$ of order $2\pi L$, or 30-50 (for L 5-8) times larger than $\delta z_{min}$.

Figure 8:
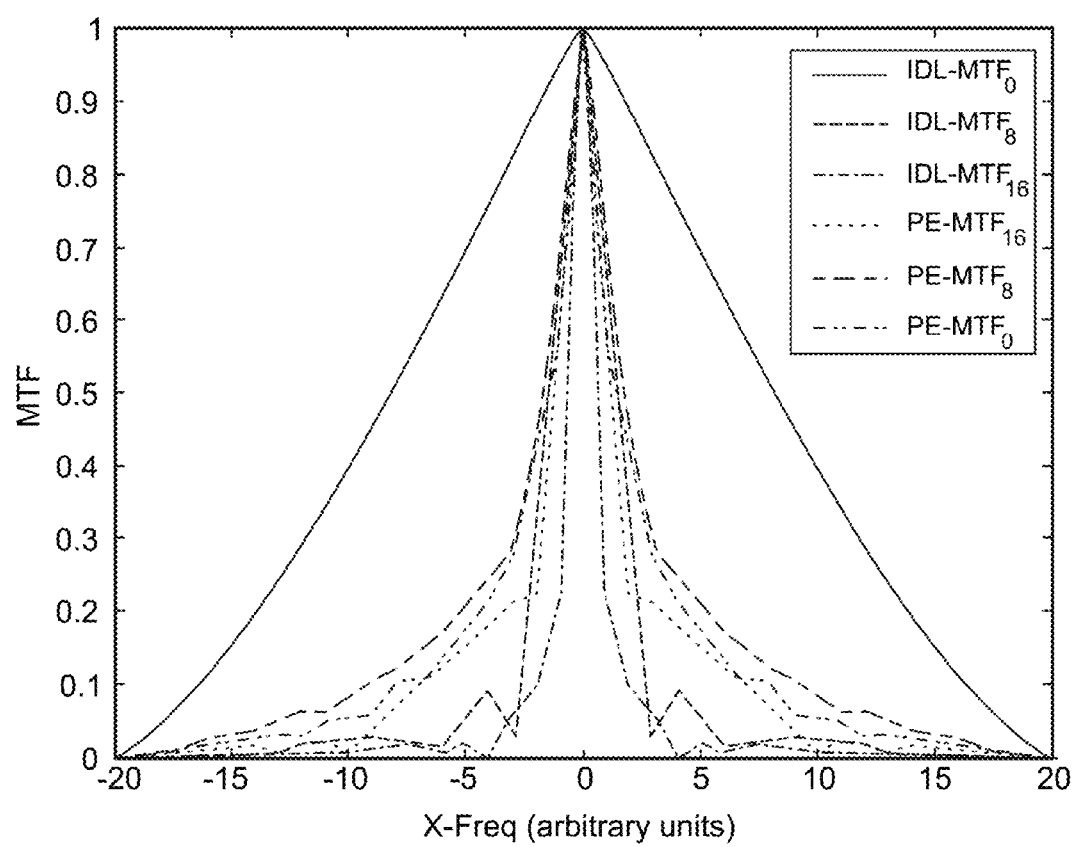
FIG. 8 is a plot of PE-MTF and IDF-MTF versus spatial frequency along the x-axis, for 0, 8, and 16 rad of defocus at the pupil edge.

The rotation of the PSF and its shape invariance with changing defocus extend to the optical transfer function as well. FIG. 8 shows the modulation transfer function (MTF) along the x axis in the spatial frequency plane for three different defocus values—namely, 0, 8, and 16 rad at the pupil edge for the device.

The corresponding MTFs for diffraction-limited imaging from a clear aperture without any phase mask are also shown in FIG. 8. Unlike the phase-engineered MTF (PE-MTF), the ideal diffraction-limited MTF (IDL-MTF) without the phase mask degrades rapidly with increasing defocus at the higher spatial frequencies. Even at large defocus values, the PE-MTF maintains a central core around the dc while remaining an order of magnitude or higher above the corresponding IDL-MTF away from the dc. Thus, the PE-MTF transmits mid-range spatial frequencies suitable for the deblurring of 3D images out to much lower signal-to-noise ratio (SNR) values.

It has also been found that the variation of the PE-PSF in a wavelength range around a central wavelength at which the mask meets the integral-phase-winding requirement shown in Equation (13) shows little degradation of performance when the wavelength range is less than 5% of the central wavelength. A combined use of multilevel masks and carefully chosen material dispersion may extend the usable wavelength range of the PSF.

The general approach of PSF rotation of the present invention generalizes readily from defocus to primary SA for which the pupil phase has a quartic, rather than quadratic, dependence on $\mu$. As a result, the zone radii may also be scaled with an index such as l as $l^{1/4}$ rather than $l^{1/2}$, while retaining the same spiraling mask phase form, namely $l\phi_\mu$ in the lth zone.

As shown in FIGS. 1-3, another embodiment of the invention, made in accordance with the above description, concerns an optical imaging system that includes an aperture 100 comprising a plurality of concentric annuli 101-105, although any desired number of rings or zones may be used. The device has a first annulus 105 at a center of the aperture to an L-th annulus at an outside edge of the aperture, each l-th annulus of the plurality of annuli for l=1,2, . . . , L comprising an outer radius proportional to the square root of l. In addition, each l-th annulus of the plurality of annuli has an azimuthally linearly increasing phase profile comprising n complete cycles for a given light wavelength.

As shown in FIGS. 1 and 3, each of the annuli steadily increases in height from zero to a height of $\alpha l$ at edge 202 or a height of $\alpha L$ at edge 201, with $\alpha$ equal to the $\lambda/(r-1)$, $\lambda$ equal to the wavelength, r equal to the index of refraction, and l/L equal to the zone index. The outer radius of each zone is $R\sqrt{l/L}$. While FIG. 1 shows a 5-zone spiral phase plate (SPP), any number of zones may be used.

Optical element 100 may also include an additional focusing surface 210. Surface 210 may be plano-convex and designed to form the image of a point source on an imaging sensor 300 as shown in FIG. 9. Any known imaging sensor may be used such as charged coupled device to convert the image into an electrical signal which may represent one or more point spread functions.

In addition, a computational processor may be provided to convert the corresponding electrical signals into an image. Applications for the embodiment include, but are not limited to, microscopes, telescopes, and target recognition systems.

The present invention also includes a method for locating a point source in three-dimensions with an optical system having a circular pupil aperture as described above. The method comprises generating a rotating point spread function (PSF) that maintains its shape and size in the image plane of the circular pupil aperture by rotating relative to its in-focus form by an angle that is proportional to the source defocus. The PSF may continuously rotate with a changing defocus. The PSF may also maintains its shape and size while rotating uniformly with changing defocus over a narrow plurality of light wavelengths at the circular pupil aperture.

As described above, the circular pupil aperture may be divided into L Fresnel zones, with the lth zone having an outer radius proportional to $\sqrt{l}$ and having a spiral phase profile of form $l\phi$ on a light wavelength, where $\phi$ is the azimuthal angle coordinate measured from a fixed x axis in the plane of said pupil.

As also shown in FIGS. 1 and 2, yet another embodiment provides an optical imaging system having an aperture comprising a circular pupil having an optical axis and a plurality of successive Fresnel zones at the entrance of the pupil. Each successive Fresnel zone has a spiral phase profile and each successive spiral phase profile has a successively larger, regularly spaced topological winding number from one zone to the next. As described above, the circular pupil has a radius R that is segmented into L different contiguous annular successive Fresnel zones with the lth zone having an outer radius equal to $R\sqrt{l/L}$. The topological winding number of the optical phase retardation, henceforth to be simply called the optical phase, increases from one zone to the next outer one as the azimuthal angle makes a complete rotation about the optical axis of the pupil by an index of l. The lth zone has a spiral optical-phase profile of form $l\phi$ that completes l complete phase cycles as the azimuthal angle $\phi$ completes a single rotation about said optical axis of said pupil.

The zones of the optical element may be clear and transparent, creating a fully transmissive device that preserves the total light power from the source space to the image plane. As also described above, the device may include a convex surface 210 that forms an image in the sensor plane such as the image plane of a microscope.

FIG. 9 shows another embodiment of the invention. It shows a schematic optical beam path of a microscope using optical element 400 made in accordance with the above teachings. The optical element may create one or more rotated images corresponding to one or more point sources.

FIG. 9 shows two point sources 402 and 403 that are located on optical axis 410 at two different depths. Rays 440-443 illustrate the formation of images for the two point sources located below the optical element. These images are rotated versions of essentially the same PSF. The rotation of the PSF with changing defocus takes place on a circle of radius 450 determined by the number of zones, L, at a rate that is inversely proportional to L. As shown image 502 corresponds to point source 402 and image 503 corresponds to point source 403. While images 502 and 503 are on the same circle 450 they have different angular locations on the sensor plane that are encode and thus may be used to determine axial depth. In addition, for a line of sight containing point sources at different depths, their images are located on a circle of the same radius and the center of the circle is located where the line of sight pierces the sensor plane.

The distance along the optical axis for which the PSF rotates without change of shape or size is on an order of $2L\lambda/(R^2/l_0^2)$ which typically is considerably larger than that of conventional microscopes in which the pupil aperture is kept free of any intentional phase aberrations. In addition, the device can serve to provide depth-extended imaging of 3D sources over a small range of field depths.

Figure 10A:
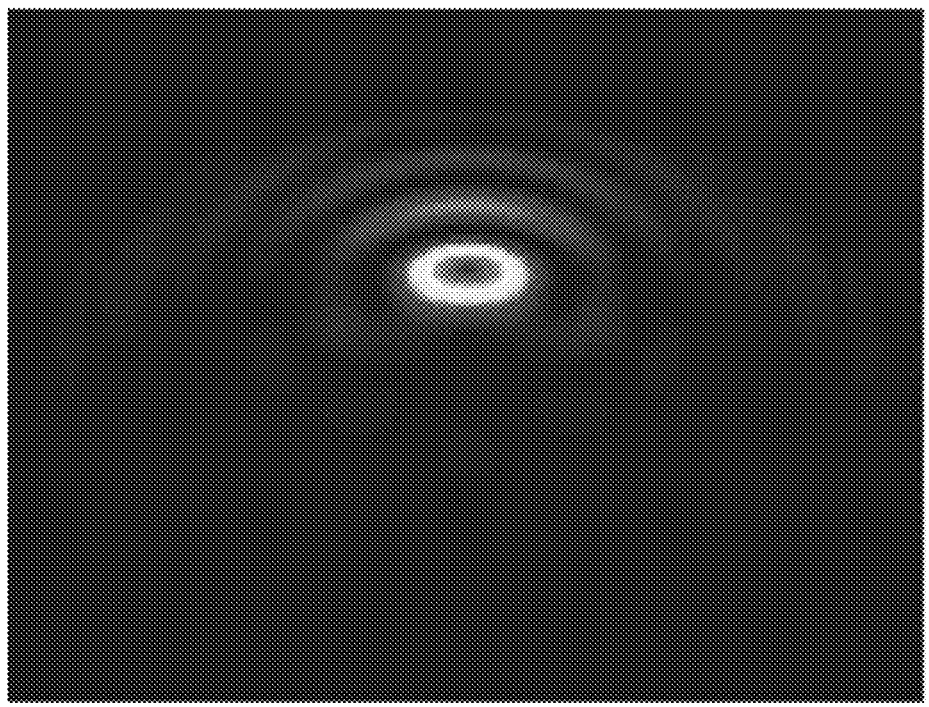
FIG. 10A is an image of a single-lobe PSF.
Figure 10B:
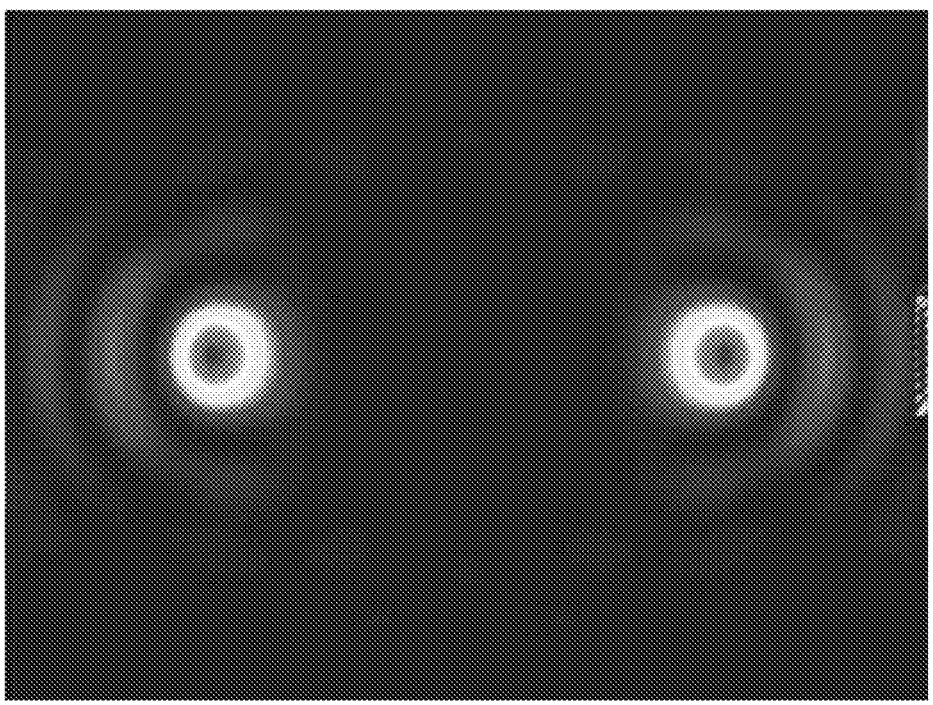
FIG. 10B is an image of a two-lobe PSF.

FIGS. 10A and 10B provide two examples of PSFs. FIG. 10A is an example of a single-lobe PSF and FIG. 10B is an example of a two-lobe PSF. These are formed by controlling the step increase in the topological winding number of optical phase from one Fresnel zone to the next larger one at 1 and 2, respectively. Many other forms of the PSF are possible, as controlled by the step increase in the winding number. All PSF designs resulting from any regular step increase in the phase winding number from one zone to the next are covered by the present claims.

Figure 11A:
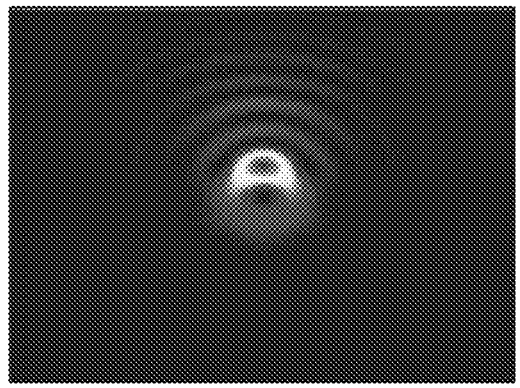
FIG. 11A, FIG. 11B and FIG. 11C are images of rotating PSF with a changing spherical aberration.
Figure 11B:
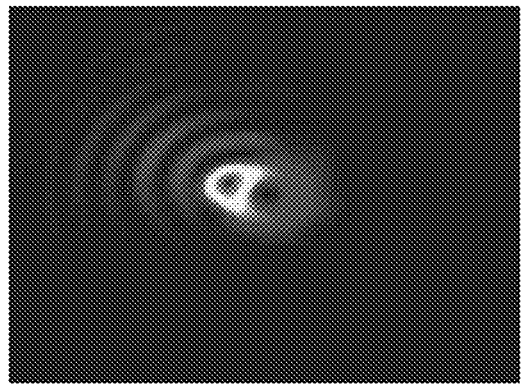
Figure 11C:
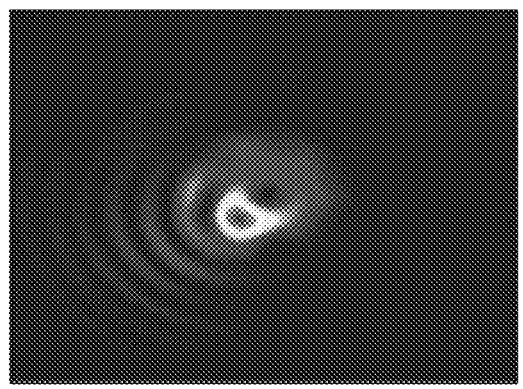

By designing the zones of the circular optical element to have an outer radius that varies as {fourth root}l with the zone index l, where l=1,2, . . . , L, a different type of optical element results. Such an element produces a rotating PSF with changing spherical aberration (SA). This design, which is a variant of the Fresnel-zone-based design of the optical element presented in FIGS. 1 and 2, is yet another embodiment. The outer radius of the lth zone in the optical element of radius R is equal to $R(l/L)^{1/4}$. The lth zone carries a spiral optical phase that performs l complete cycles in one complete circuit around the optical axis. The optical-element can be utilized in a microscope which can measure the SA of its own convex focusing surface. The PSF structure obtained by means of this optical element is shown in FIGS. 11A-11C for three different representative values of SA. The rotation of the PSF provides a direct measure of the amount of SA, as the succession of the PSFs with changing SA shows.

The optical elements described above may also be placed in a separate, conjugate plane with respect to the pupil aperture by means of an optical relay system. Such an optical-relay-based design in which the focusing element and the optical element giving rise to shape and size-invariant rotating PSF are in mutually conjugate planes, rather than on a single physical element, is also covered by the present claims.

Applications for the optical elements include three-dimensional (3D) source localization for single-molecule biological microscopy. Deep retinal snapshot imaging for early detection and 3D localization of retinal defects. Space-based debris localization and tracking for military applications and 3D optical localization and tracking of particulate contaminants in an otherwise pure and optically clear medium for industrial applications.

The concept may be extended to furnish a 3D localization system in any wave domain, including ultrasound and acoustic wave sensors, transducers, and focusing elements. The present claims cover such extensions as well.

In yet other aspects of the present invention, a q-plate provides a birefringent device to convert the SAM to OAM. A q-plate, with q=1 and exactly a half-wave of birefringence, is a pure circular polarization (CP) converter that inter-converts the right and left circularly polarized photons with a spiral phase of amount±2qϕ for the right CP (RCP) and −2qϕ for left CP (LCP) states, respectively, of the incident photon. The plate is distinguished from other birefringent plates like half wave and quarter wave plates in having its local axis of birefringence rotate by an angle ψ that depends linearly on the azimuthal angle, ϕ, of the location on the plate by the relation, ψ=qϕ+α. When combined with a SPP as described above, with a fixed sense of phase rotation, the q-plate either adds to or subtracts from the spiral phases of the various zones of the SPP 2q units of spiral phase rotation depending on whether the beam is in the RCP or LCP state of polarization.

Figure 12:
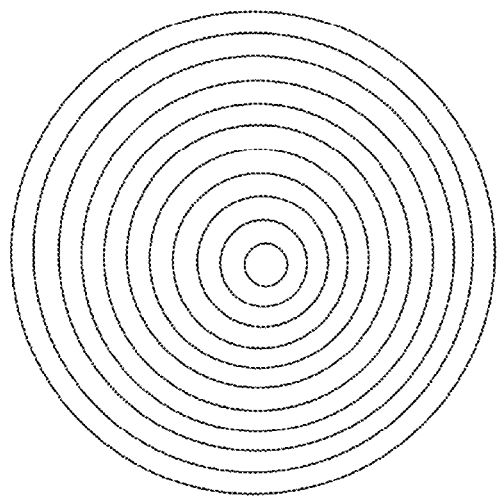
FIG. 12 illustrates adding a birefringent device to secure the SAM to OAM conversion for one embodiment of the present invention.

A schematic diagram of the distribution of the local axis of birefringence is shown in FIG. 12 for the case of q=1 and α=π/2. As shown in FIG. 12, and as stated above, a q-plate is a birefringent device whose axis of birefringence rotates locally as a function of angular position on the plate via the equation, ψ=qϕ+α, where ψ is the angle of rotation of the axis, ϕ the azimuthal angular coordinate on the plate relative to a fixed x axis, and α a constant.

In one aspect, a q plate has a half-wave of birefringence everywhere, but the modified q-plate described herein performs a relative phase retardation between the parallel and perpendicular polarizations that is different from the half-wave phase retardation of amount π by an amount β. For the case for which equations (13)-(15) have been derived, as set forth herein, q=1 and α=π/2, but other values of q and α may be treated in the same way. The q-plate for this choice of parameter values is shown in FIG. 12.

In yet another embodiment of the present invention, a modified q-plate may be used. For this embodiment, q=1, or any half integer or integer, but with a birefringence that is made different from a half wave, as described above, that yields an imperfect CP converter that can be utilized to encode the full set of four Stokes parameters in terms of which the transverse polarization of any optical beam can be expressed most generally. Such an imperfect polarization converter, when combined with the SPP described above, such as optical element 100, can jointly encode the full spatial and polarimetric degrees of freedom of the point source.

Figure 13:
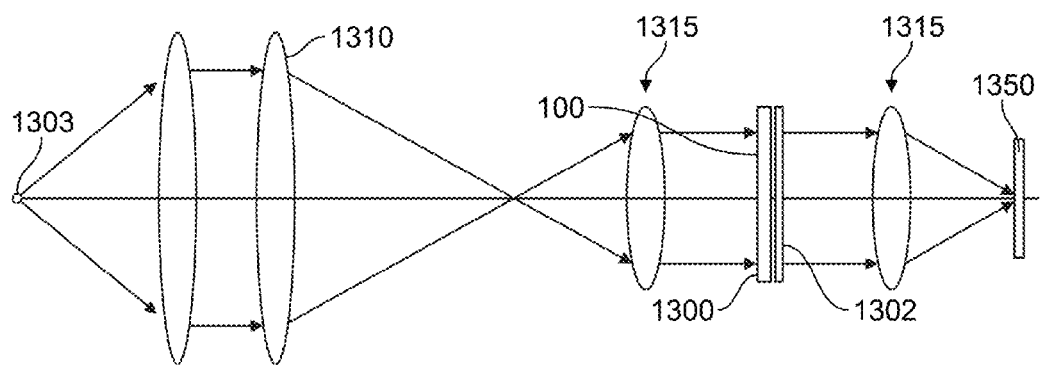
FIG. 13 illustrates an imaging beam path in an imager using the combined SPP-MQP device of an embodiment of the present invention.
Figure 14:
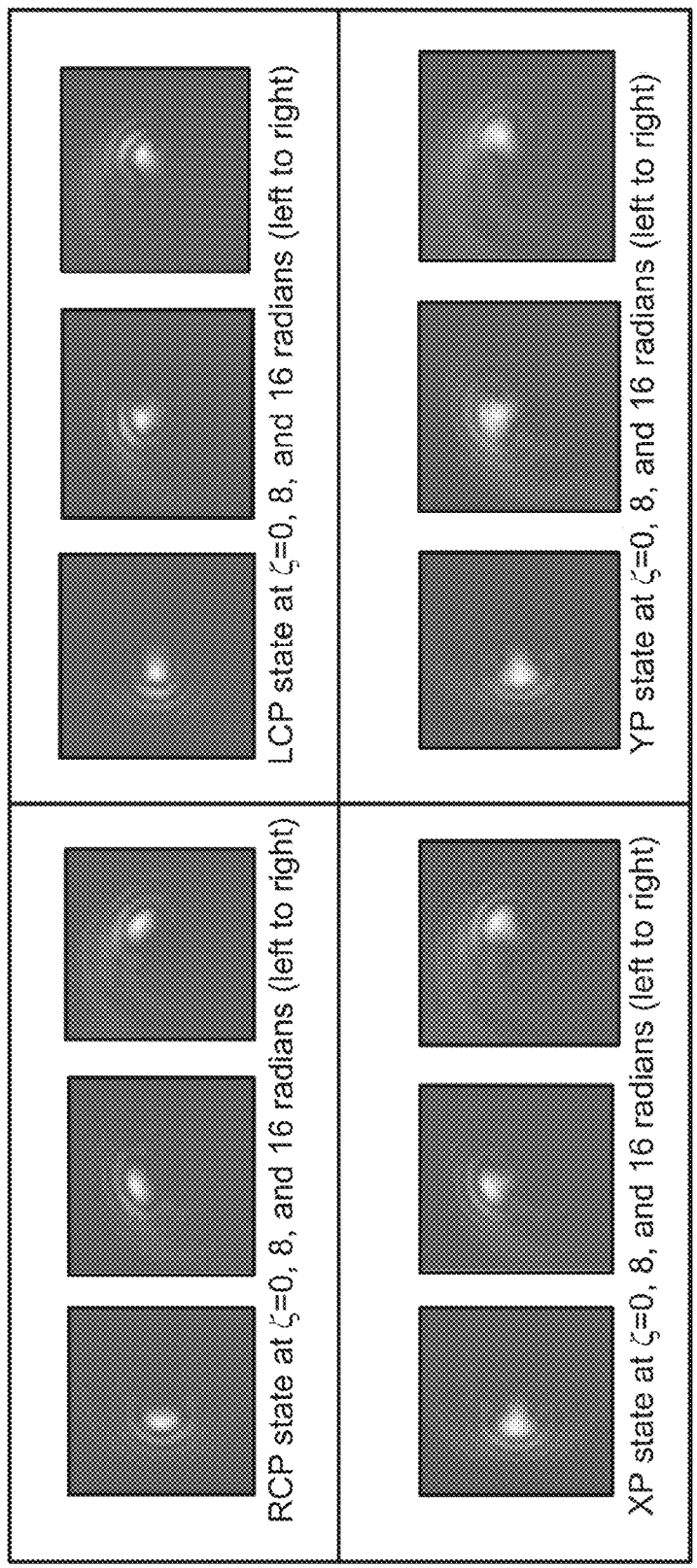
FIG. 14 shows the results of numerical evaluation of the PSF intensity given by Eq. (13) for different polarization states, i.e., different values of the Stokes vector $(s_0,s_1,s_2,s_3)$ and for three different values of defocus, as measured by the parameter $\zeta$, which is proportional to the actual distance of the source from the plane of Gaussian focus and is equal to the corresponding phase (in radians) at the edge of the pupil. The various polarization states for which the PSF is plotted here refer to right circular polarization (RCP) for which $s_0=s_3$, $s_1=s_2=0$; left circular polarization for which $s_0=-s_3$, $s1=s_2=0$; x-polarized (XP) state for which $s_0=s_1$, $s_2=s_3=0$; and y-polarized state for which $s_0=-s_1$, $s_2=s_3=0$.

The modified q plate (MQP) may be placed in a conjugate plane of the principal focusing element, such as an objective for a microscope and primary for a telescope, of an imager that already incorporates the SPP either in the same plane as the MQP or in another of its conjugate planes. FIG. 13 provides a schematic diagram showing the beam path and typical optical components of a high-resolution microscope, including the proposed SPP-MQP combination plates 1300 in a single conjugate plane. The different magnifications of the beam in different sections of the imager would necessitate design modifications of the SPP 100 and MQP 1302 that accommodate these differences, but all these differences, which are of a simple practical form, are covered by the embodiments of the present invention.

FIG. 13 shows the path of an imaging beam emanating from a point source 1303 in a typical high-resolution microscope set-up on an optical bench. The tube lens 1310 transports the image to a location where the use of 4f relay lenses 1315 can accommodate, in its common focal plane, the combination of SPP and MQP plates 1300. The SPP can also be simulated by a liquid-crystal spatial light modulator (SLM), but that entails a cost of light efficiency due to its being polarization sensitive. An imaging sensor element 1350 is configured to receive light and may be used to produce a corresponding electrical signal representing the location of an object to be imaged.

The combined SPP-MQP device 1300, when placed in a conjugate plane of an imager with a circular aperture of radius R, generates the following image intensity as a function of the image plane radial and angular coordinates, $(s,\phi)$, and the optical wavelength, $\lambda=2\pi/k$, for object and image plane distances from the aperture denoted by $z_0$ and $z_1$:

$$s_0^{(l)}(s, \phi; \zeta) = \frac{k^6 R^4}{32\pi^2 \epsilon_0^2 z_O^2 z_I^2} \tag{13}$$

$$\left\{ \begin{array}{l} (s_0+s_3)A_+(s,\phi;\zeta)+(s_0-s_3)A_-(s,\phi;\zeta)+ \\ \text{Im}[(s_1+is_2)e^{2i\phi}B_+(s,\phi;\zeta)+(s_1-is_2)e^{-2i\phi}B_-(s,\phi;\zeta)] \end{array} \right\}^1,$$

where the functions $A_\pm$ and $B_\pm$ are given in terms of certain sums over the L zones of the SPP as $$A_\pm(s,\phi;\zeta) = \left| \sum_{l=1}^{L} I_{l\pm2}(\zeta,s)(-i)^l e^{-il\phi} \right|^2 \cos^2(\beta/2) + \qquad (14)$$

$$\left| \sum_{l=1}^{L} I_l(\zeta,s)(-i)^l e^{-il\phi} \right|^2 \sin^2(\beta/2);$$

$$B_\pm(s,\phi;\zeta) = \left[ \sum_{l=1}^{L} I_{l\mp2}(\zeta,s)(-i)^l e^{-il\phi} \right] \left[ \sum_{l=1}^{L} I_l^*(\zeta,s)(i)^l e^{il\phi} \right] \sin\beta;$$

with the zone integrals defined as $$I_\mu(\zeta,s) \stackrel{def}{=} \int_{\sqrt{(l-1)/L}}^{\sqrt{l/L}} du\, u e^{i\zeta u^2} J_\mu(2\pi us),\ \mu = l, l\pm 2. \qquad (15)$$

The parameter β is the deficit phase of the MQP birefringence relative to the usual q-plate birefringence phase of π (half wave), while ζ is the defocus-dependent phase at the edge of the circular pupil, defined above. Eq. (13) applies to the specific case of spiral phase quantum (or winding) number of the SPP increasing by 1 from 1 in the innermost (1st) circular zone out to L in the outermost (Lth) annular zone. But other designs that include a non-unity but fixed integer step in the increment of the spiral phase winding number and a fixed integer offset are within the scope of the embodiments of the present invention.

It may be shown, that $A_\pm(s,\phi,\zeta)$ and $B_\pm(s,\phi,\zeta)$ are approximately functions of the difference of the angular and defocus arguments, namely (φ−ζ/L), so they rotate with changing defocus, thus allowing the image intensity $s_0^{(I)}$, or the PSF, given by Eq. (13) above to encode the axial depth of the source (i.e., its z coordinate) in the angle of rotation of the PSF, while the 2D location of the center of rotation yields its transverse (x,y) coordinates. Any non-rotating phase factors, such as exp(±2iφ), in the intensity equation cause a slowly-varying angular modulation of the rotating PSF, and can be removed by PSF model fitting in computational post-processing of the image data, and thus the precise 3D location of the source recovered with very high, subwavelength precision. The post-processing needed to recover the location of a single point source can be generalized rather simply to determine the 3D locations of multiple point sources in the field with non-overlapping images with very high resolution.

The parameters $s_0$, $s_1$, $s_2$, $s_3$ denote the four Stokes parameters in terms of which an arbitrary source polarization may be expressed. They occur linearly in the PSF intensity equation (13) above, so the form of the PSF intensity signal captures the values of these Stokes parameters rather robustly even in the presence of small amounts of detection noise that can corrupt the signal. In other words, the rotating PSF produced by the combined SPP-MQP device carries joint information about the 3D location (through the angle and center of image rotation) and full polarimetric state of each point source in the 3D field in the snapshot mode.

In other aspects, the polarimetric capabilities of the present invention extend to circular, elliptical or mixed polarizations of arbitrary strengths, which are typically not acquired by even the most specialized sensor pixels such as polarimetric superpixels or wire-grid pixels that are all designed for linear polarizations. Since the PSF intensity given by (13) is the total intensity, summed over the two polarization states without any polarization analysis, the embodiments of the present invention require polarization-insensitive sensor pixels without the need for any customized pixel engineering.

Some representative PSF intensity patterns given by evaluating Eq. (13) numerically are shown in surface plots in FIG. 15, where it is easily appreciated that the PSF patterns for different polarization states are different from one another at each value of the axial defocus, as represented by the value of the parameter ζ. Note the distinctive signature of rotation of the PSF with changing axial defocus while the PSF shape and size are largely unchanged over the range of defocus values considered in these plots. A similar but opposite rotation, not shown here, again with only a slow change of shape and size due to the presence of complex exponentials of slowly varying but non-rotating phases proportional to φ in Eq. (13), takes place as the value of ζ is made negative and increased in magnitude over similar values. An SPP with L=7 zones and an MQP with q=1, α=π/2 was employed for these plots.

The field depth around the plane of Gaussian focus that the device can acquire in a single snapshot is of order 2L times that of a conventional clear-aperture imager with no phase plates of any kind. For a practical device with L=7–10 zones, this amounts to a 15-20 times increased depth of field (DOF). To cover a still deeper 3D field, the imager using the combined SPP-MQP device can be refocused repetitively to quickly acquire a large 3D field in relatively few snapshots, unlike scanning imagers like scanning confocal microscope, total-internal reflection fluorescence (TIRF) microscope, and optical coherence tomography (OCT) imager all of which must scan a 3D sample painstakingly one thin (typically sub-wavelength-thick) layer at a time.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An optical imaging system comprising:
    an aperture comprising a plurality of concentric annuli numbered from a first annulus at a center of the aperture to an L-th annulus at an outside edge of the aperture, each l-th annulus of the plurality of annuli for l=1, 2, . . . , L comprising an outer radius proportional to the square root of l, each l-th annulus of the plurality of annuli for l=1,2, . . . , L comprising an azimuthally linearly increasing phase profile comprising l complete cycles for a given light wavelength;
    a birefringent plate:
    said aperture and said birefringent plate adapted to jointly encode the full spatial and polarimetric degrees of freedom of the point source.

2. The imaging system of claim 1 wherein said imaging system is a three-dimensional imaging system.

3. The imaging system of claim 1 wherein said imaging system is an object tracking system.

4. The imaging system of claim 1 wherein said imaging system is a microscope.

5. The imaging system of claim 1 wherein said birefringent plate performs a phase retardation between the parallel and perpendicular polarizations that is different from the half-wave phase retardation of amount $\pi$ by an amount $\beta$.

6. An optical imaging system comprising:
   an aperture comprising a circular pupil having an optical axis and a plurality of successive Fresnel zones at the entrance of said pupil;
   each of said successive Fresnel zones having a spiral phase profile;
   each successive spiral phase profile having a successively larger topological winding number from one zone to the next; and
   a birefringent plate:
   said aperture and said birefringent plate adapted to jointly encode the full spatial and polarimetric degrees of freedom of the point source.

7. The imaging system of claim 6 wherein said birefringent plate performs a relative phase retardation between the parallel and perpendicular polarizations that is different from the half-wave phase retardation of amount $\pi$ by an amount $\beta$.

8. The optical imaging system of claim 6 wherein said circular pupil has a radius R that is segmented into L different contiguous annular successive Fresnel zones with the lth zone having an outer radius equal to $R\sqrt{l/L}$.

9. The optical imaging system of claim 6 wherein said topological winding number of the optical phase retardation increases from one zone to the next outer zone as the azimuthal angle makes a complete rotation about said optical axis of said pupil by an index of l.

10. The optical imaging system of claim 6 wherein said lth zone has a spiral optical-phase profile of form $l\phi$ that completes l complete phase cycles as the azimuthal angle $\phi$ completes a single rotation about said optical axis of said pupil.

11. The optical imaging system of claim 6 wherein the height of each said lth zone steadily increases in height to a maximum height of $\alpha l$, with $\alpha$ equal to $\lambda/(r-1)$, $\lambda$ equal to the wavelength used with the device, r equal to the index of refraction of the device, and l equal to the zone index.

12. The optical imaging system of claim 6 wherein said circular pupil has a radius R that is segmented into L different contiguous annular successive Fresnel zones with the lth zone having an outer radius equal to {fourth root}l and having a rotating PSF that changes with the spherical aberration.

13. A method for locating a point source and estimating its polarimetric degrees of freedom in three-dimensions with an optical system having a circular pupil aperture, the method comprising:
   generating a rotating point spread function (PSF) that maintains its shape and size in the image plane of said circular pupil aperture by rotating relative to its in-focus form by an angle that is proportional to the source defocus and using said PSF to determine the three-dimensional coordinates of said point source and modifying said PSF polarimetrically.

14. The method of claim 13 wherein said PSF is modified polarimetrically by a birefringent plate.

15. The method of claim 13 wherein said PSF is modified polarimetrically by a birefringent plate that converts the spin angular momentum of a photon to its orbital angular momentum.

16. The method of claim 15 wherein said PSF is modified polarimetrically by a birefringent plate that converts the spin angular momentum of a photon to orbital angular momentum in a single snapshot over a 3D field.

17. The method of claim 15 wherein said PSF is modified polarimetrically by a birefringent plate that converts the spin angular momentum of a photon to orbital angular momenta in a plurality of snapshots.

18. The method of claim 13 wherein said PSF continuously rotates with a changing defocus.

19. The method of claim 16 wherein said PSF maintains its shape and size while rotating uniformly with changing defocus over a narrow plurality of light wavelengths at said circular pupil aperture.

20. The method of claim 13 wherein said circular pupil aperture is divided into L Fresnel zones, with the lth zone having an outer radius proportional to $\sqrt{l}$ and having a spiral phase profile of form $l\phi$ on a light wavelength, where $\phi$ is the azimuthal angle coordinate measured from a fixed x axis in the plane of said pupil.

* * * * *